United States Patent [19]

Deguchi et al.

[11] Patent Number: 5,834,559

[45] Date of Patent: Nov. 10, 1998

[54] THERMOPLASTIC RESIN COMPOSITIONS HAVING EXCELLENT ANTISTATIC PROPERTIES

[75] Inventors: Jichio Deguchi; Toshikazu Mizutani, both of Yokkaichi, Japan

[73] Assignee: Mitsubishi Chemical Corporation, Tokyo-To, Japan

[21] Appl. No.: 584,392

[22] Filed: Jan. 11, 1996

[30] Foreign Application Priority Data

Jan. 9, 1995 [JP] Japan .................................. 7-001259

[51] Int. Cl.$^6$ .................. C08L 23/12; C08L 33/24
[52] U.S. Cl. .................. 525/93; 525/98; 525/218; 524/217; 524/913
[58] Field of Search .................. 525/93, 98, 218; 524/217, 913

[56] References Cited

U.S. PATENT DOCUMENTS

| | | | |
|---|---|---|---|
| 4,871,805 | 10/1989 | Shimomura | 525/98 |
| 5,086,109 | 2/1992 | Ueno | 525/98 |
| 5,202,193 | 4/1993 | Sumi | 428/479.6 |
| 5,492,967 | 2/1996 | Djiauw | 525/98 |

FOREIGN PATENT DOCUMENTS 320526  12/1993  Japan.

*Primary Examiner*—David Buttner
*Attorney, Agent, or Firm*—Oblon, Spivak, McClelland, Maier & Neustadt, P.C.

[57] ABSTRACT

A thermoplastic resin composition having excellent antistatic properties comprising 100 parts by weight of the following component (A), 3 to 30 parts by weight of the following component (B) and 5 to 40 parts by weight of the following component (C): component (A): a crystalline propylene resin having a melt flow rate (MFR) of 1 to 80 g/10 min; component (B): a thermoplastic elastomer selected from ($b^1$) olefin copolymer elastomers having a Mooney viscosity ($ML_{1+4}$ (100° C.)) of 10 to 85, and ($b^2$) hydrogenated products of a block copolymer of styrene or a derivative thereof and a conjugated diene, containing 15 to 50% by weight of styrene or a derivative thereof, having a weight-average molecular weight of 50,000 to 220,000; and component (C): an acrylamide copolymer.

8 Claims, 2 Drawing Sheets

THERMOPLASTIC RESIN COMPOSITIONS HAVING EXCELLENT ANTISTATIC PROPERTIES

BACKGROUND OF THE INVENTION

1. Field of the Art

The present invention relates to thermoplastic resin compositions having excellent antistatic properties, from which static-free containers to be used for the storage or transportation of electronic parts such as semiconductors and substrates of electronic circuits, and a variety of electronic equipments and precision machines, static-free packaging materials for these things; static-free containers or packaging materials to be used to protect medical supplies, cosmetics, foods and the like from dusts, or to be used for the transportation of these things; and static-free containers or the like to be used for the storage of hazardous materials and the like can be produced.

2. Background Art

Heretofore, crystalline propylene thermoplastic resins have been used to make containers or the like to be employed for storage or transportation in various fields. This is because such resins are economical, excellent in molding properties and durability, and also light in weight.

However, crystalline propylene thermoplastic resins have high electrical resistance, and are not conductive, so that containers or the like made from these resins easily generate static electricity and undergo static electrification due to friction, impact, vibration or the like caused during transportation. Various troubles are thus caused.

In particular, in the field of containers for electronic equipments, there have been such cases that ICs, LSIs and the like placed in the containers are broken or damaged by static electricity generated due to friction, impact, vibration or the like while the containers are being transported. For this reason, it has been a serious subject to impart antistatic properties to such containers.

In order to solve the above-mentioned problem, a conductive filler such as carbon black, or an antistatic agent has been conventionally incorporated into a propylene resin so as to impart thereto conductivity, thereby obtaining a composite resin having antistatic properties.

Metallic fiber, metallized fiber, carbon black, carbon fiber, graphite, tin oxide, zinc oxide, indium oxide or the like has been used as the conductive filler.

Although such a composite plastic incorporated with a conductive filler can stably and permanently reveal antistatic properties, containers to be used for storage or transportation, made from the composite plastic are heavy in weight because the specific gravity of the filler incorporated is high. Further, some problems other than the problem of static electricity may be newly introduced by staining caused due to heavy metallic impurities contained in the above-described conductive fillers, or by dusting caused, depending upon the manner of use, due to the separation of the conductive filler from the composite plastic.

A glycerin-fatty acid ester, an alkyl diethanol amide, a sorbitan-fatty acid ester or the like has been generally used as the antistatic agent to be incorporated into a propylene resin. Such an antistatic agent has a low molecular weight, so that the agent migrates to the surface of the resin and bleeds therefrom after the resin incorporated with the agent is molded. The resin can thus reveal antistatic properties.

However, the antistatic agent bleeding on the surface of the resin is readily removed by washing or the like. It is therefore difficult for the resin to stably and permanently retain the antistatic properties. Further, a container made from the resin has such a shortcoming in that the antistatic agent bleeding on the surface of the resin tends to stain the content of the container, for example, electronic parts.

Thus, the above-described conventional propylene resins imparted with antistatic properties are still unsatisfactory to be used for producing containers, in particular, those which are used for the storage or transportation of electronic parts.

In order to solve the aforementioned problems, techniques for imparting antistatic properties to propylene resins, in which one of the following hydrophilic polymers is incorporated into a propylene resin, have been proposed recently:

(1) a mixture of a specific polyether ester amide and a modified vinyl copolymer having a carboxyl group, disclosed in Japanese Laid-Open Patent Publication No. 23435/1985;

(2) a comb copolymer of a polymeric monomer obtained by converting carboxyl group at the terminal end of polymethyl methacrylate into methacryloyl group by using glycidyl methacrylate, and an aminoalkyl acrylate or acrylamide, or a quaternized cation-modified product thereof, disclosed in Japanese Laid-Open Patent Publication No. 121717/1987; and (3) an acrylamide copolymer consisting of ethylene structural unit, acrylate structural unit and acrylamide structural unit, or a polyolefin resin composition comprising the acrylamide copolymer, disclosed in Japanese Laid-Open Patent Publications Nos. 198308/1992 and 126446/1995.

However, although such a propylene resin composition incorporated with any one of the above hydrophilic polymers is light in weight, and can stably and permanently reveal antistatic properties, the hydrophilic polymer particles dispersed in the resin composition tend to form streaks in the direction of molding when the resin composition is melt molded because the compatibility between the hydrophilic polymer and the propylene resin is poor. As a result, delamination is caused due to the streakily dispersed hydrophilic polymer particles, existing in the vicinity of the surface of the molded product. The delamination frequently causes such troubles that the appearance of the molded product becomes worse and that the impact resistance of the molded product is impaired. A satisfactory propylene resin having antistatic properties is not available so far.

An object of the present invention is to provide a thermoplastic resin composition which can stably and permanently reveal antistatic properties, which is free from the shortcomings in the prior art, such as the separation or uneven dispersion of an antistatic-properties-imparting component, and which has high mechanical strength and lightweight properties.

SUMMARY OF THE INVENTION

It has now been found that the above-described object can be attained by incorporating a specific thermoplastic elastomer and an acrylamide copolymer into a propylene resin in specific proportions.

Thus, the thermoplastic resin composition of the present invention having excellent antistatic properties comprises 100 parts by weight of the following component (A), 3 to 30 parts by weight of the following component (B) and 5 to 40 parts by weight of the following component (C):

component (A): a crystalline propylene resin having a melt flow rate (MFR) of 1 to 80 g/10 min;

component (B): a thermoplastic elastomer selected from ($b^1$) olefin copolymer elastomers having a Mooney viscosity (ML1+4 (100° C.)) of 10 to 85, and (b²) hydrogenated products of a block copolymer of styrene or a derivative thereof and a conjugated diene, containing 15 to 50% by weight of styrene or a derivative thereof, having a weight-average molecular weight of 50,000 to 220,000; and component (C): an acrylamide copolymer.

Such a thermoplastic resin composition of the present invention, having excellent antistatic properties can stably and permanently reveal antistatic properties, is free from the separation or uneven dispersion (streaky dispersion) of an antistatic-properties-imparting component, and has high mechanical strength and lightweight properties. Therefore, the resin composition of the present invention can be beneficially used for producing containers, in particular, those for electronic parts.

Figure 1A:
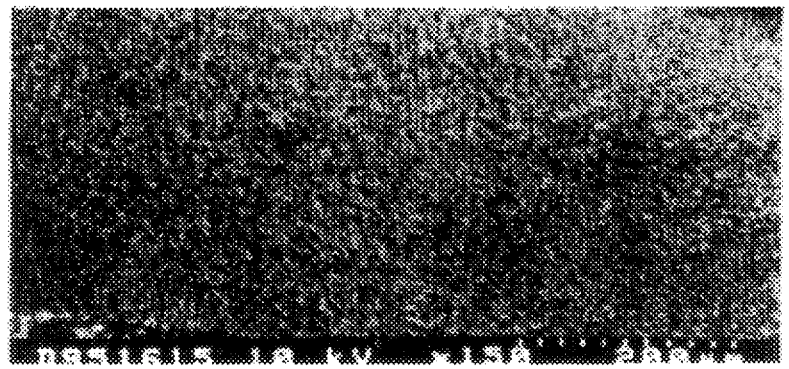
FIGS. 1 and 2 include electron photomicrographs, showing the state of dispersion of the acrylamide copolymer (component (C)) in the presence or absence of the thermoplastic elastomer.
Figure 1B:
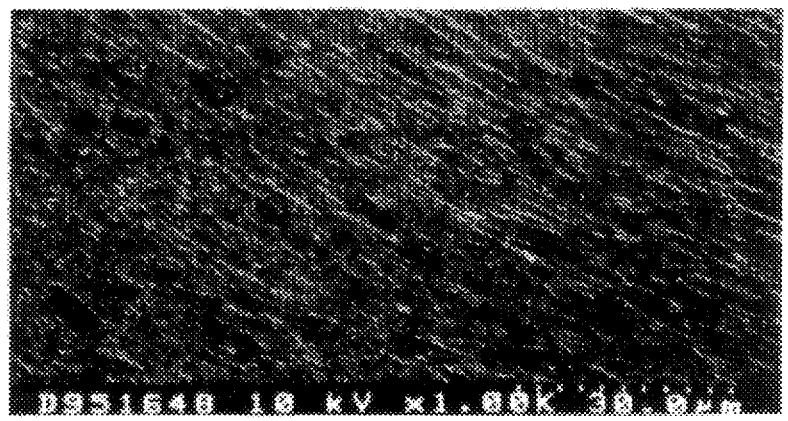
Figure 1C:
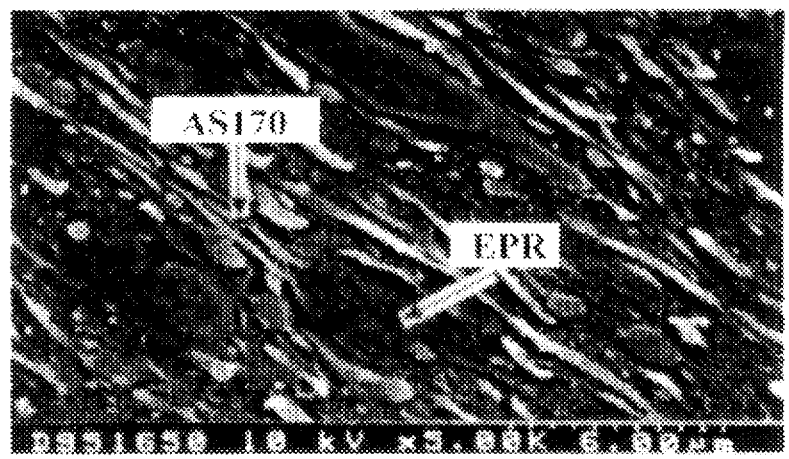
Figure 2A:
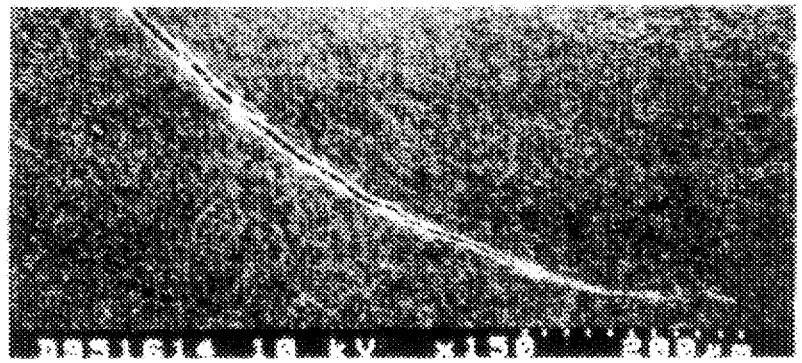
Figure 2B:
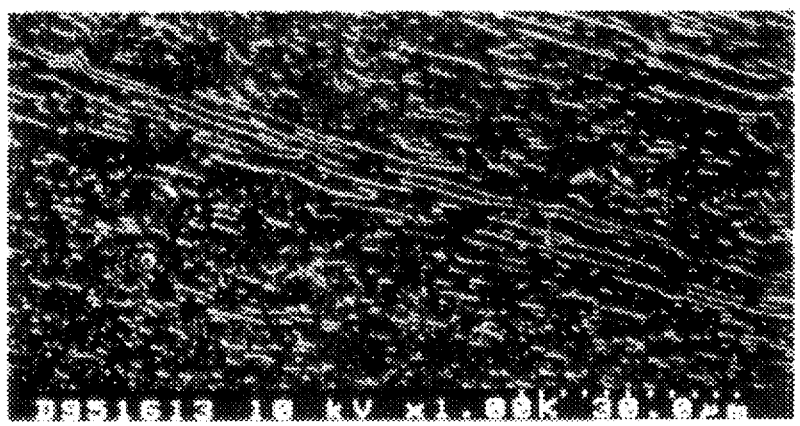
Figure 2C:
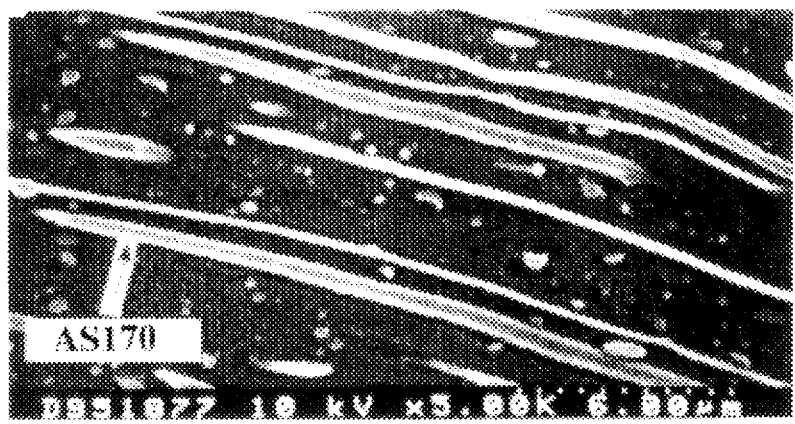

Photograph 1A is an electron photomicrograph (150× magnifications) of the cross section of the sheet obtained by molding in Example 1;

Photograph 1B an electron photomicrograph (1000× magnification) of the cross section of the sheet obtained by molding in Example 1;

Photograph 1C is an electron photomicrograph (5000× magnification) of the cross section of the sheet obtained by molding in Example 1;

Photograph 2A is an electron photomicrograph (150× magnification) of the cross section of the delaminated part of the sheet obtained by molding in Comparative Example 6;

Photograph 2B is an electron photomicrograph (1000× magnification) of the cross section of the delaminated part of the sheet obtained by molding in Comparative Example 6; and Photograph 2C is an electron photomicrograph (5000× magnification) of the cross section of the delaminated part of the sheet obtained by molding in Comparative Example 6.

DETAILED DESCRIPTION OF THE INVENTION

[1] Thermoplastic Resin Composition (1) Components (a) Crystalline Propylene Resin (Component (A))

In the thermoplastic resin composition of the present invention, having excellent antistatic properties, a propylene resin having a melt flow rate (MFR, at 230° C., under a load of 2.16 kg) of 1 to 80/10 min, preferably 3 to 60 g/10 min, more preferably 3 to 40 g/10 min, as measured in accordance with ASTM D1238, is used as the crystalline propylene resin. Examples of such a propylene resin include propylene homopolymers, propylene-ethylene block copolymers, and propylene-ethylene-butene random copolymers, in which the ethylene content is from 0 to 15% by weight, preferably from 2 to 12% by weight, more preferably from 4 to 10% by weight, and the alpha-olefin (C=4 to 12) content is from 0 to 20% by weight, preferably from 0 to 10% by weight, more preferably from 0 to 5% by weight.

The crystallinity of the propylene resin measured by X-ray diffractometry is generally from 50 to 90%, preferably from 60 to 85%, more preferably from 65 to 80%.

When a crystalline propylene resin having an MFR of lower than the above-described range is used, the resulting resin composition has an elevated heating melt viscosity. Such a resin composition is poor in molding properties, and the molded product therefore tends to have poor appearance. On the other hand, when a crystalline propylene resin having an MFR of higher than the above range is used, the resulting resin composition has decreased mechanical strength. Therefore, such a resin composition cannot be used for producing containers.

When the crystallinity of the propylene resin is lower than 50%, the resulting resin composition has a low rigidity. When the crystallinity exceeds 90%, on the other hand, the resulting resin composition tends to have a low impact strength.

(b) Thermoplastic Elastomer (Component (B))

In the thermoplastic resin composition of the present invention, having excellent antistatic properties, a thermoplastic elastomer selected from (b¹) olefin copolymer elastomers having a Mooney viscosity (ML1+4 (100° C.)), as measured in accordance with ASTM D1646, of 10 to 85, and (b²) hydrogenated products of a block copolymer of styrene or a derivative thereof and a conjugated diene (hereinafter may be simply referred to as a styrene elastomer), containing 15 to 50% by weight of styrene or a derivative thereof is used as the thermoplastic elastomer, the component (B). The compatibility of thermoplastic elastomers other than the above ones with the above component (A) is poor, so that such thermoplastic elastomers will be a cause of delamination.

Further, the olefin elastomers are more preferable than the styrene elastomers because they are highly compatible with both the components (A) and (C).

(1) Olefin copolymer elastomer (b¹)

A copolymer of ethylene and other monomer, having rubber elasticity and a Mooney viscosity (ML1+4 (100° C.)), as measured according to ASTM D1646, of 10 to 85, preferably 15 to 80, more preferably 20 to 75 is used as the olefin copolymer elastomer (b¹).

Specific examples of such an olefin copolymer elastomer include ethylene-propylene copolymer elastomers (EPMs), ethylene-butene-1 copolymer elastomers (EBMs), and ethylene-propylene-unconjugated diene copolymer elastomers (EPDMs) with an unconjugated diene such as 5-ethylidene-2-norbornene, 5-methylene-2-norbornene or dicyclopentadiene.

An olefin copolymer elastomer having a weight-average molecular weight of 50,000 to 250,000, preferably 100,000 to 250,000 is suitably used in the present invention.

When an olefin copolymer elastomer whose Mooney viscosity is lower than the above-described range is used, such an elastomer cannot act as a component for fixing the uniform network dispersion of the acrylamide copolymer, the component (C), which is an aim of the present invention. In addition, the elastomer cannot fully reinforce the impact resistance of the resulting resin composition, so that it is of no practical use. On the other hand, an olefin copolymer elastomer whose Mooney viscosity is in excess of the above range is lacking in dispersibility in the propylene polymer. Therefore, when such an elastomer is used, the molded product obtained from the resulting resin composition is to have poor appearance. Thus, this elastomer is of no practical use.

An olefin copolymer elastomer whose weight-average molecular weight is less than the above-described range tends to have impaired rubber elasticity and decreased mechanical strength. On the other hand, when an olefin copolymer elastomer whose weight-average molecular weight is more than the above range is used, the resulting resin composition tends to have impaired molding properties, so that the molded product obtained from the composition cannot have good appearance.

In the case where an ethylene-propylene copolymer elastomer (EPM) is used as the olefin copolymer elastomer, it is favorable to use one whose propylene content is from 10 to 60% by weight (ethylene content being 90 to 40% by weight), preferably from 15 to 55% by weight (ethylene content being 85 to 45% by weight). The propylene contents (ethylene contents) herein defined are those which are determined by infrared spectroscopic analysis or the like.

There is no particular limitation on the method of production of the olefin copolymer elastomers and on the shape of the product (pellet, bale, crumb, etc.). It is also possible to use those olefin copolymer elastomers which have been crosslinked chiefly by radicals by heat-treating the above-described olefin copolymer elastomers in the presence of an organic peroxide.

(2) Hydrogenated product of a block copolymer of styrene or a derivative thereof and a conjugated diene ($b^2$)

The hydrogenated product of a block copolymer of styrene or a derivative thereof and a conjugated diene to be used in the present invention is one obtained by hydrogenating a block copolymer of styrene or a derivative thereof and a conjugated diene, having a styrene content of 5 to 50% by weight.

Examples of the derivative of styrene include alpha-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, and 4-(phenylbutyl)-styrene. Of these, styrene and alpha-methylstyrene are preferred.

Typical conjugated dienes are butadiene, alkyl-substituted butadienes such as isoprene and 2,3-dimethylbutadiene, methylpentadiene, and a mixture thereof. Of these, butadiene, isoprene, or a mixture thereof is preferably used in the present invention as the conjugated diene.

In the case where a mixture of isoprene and butadiene is used as the conjugated diene, one with an isoprene/butadiene ratio (weight basis) of 99/1 to 1/99, preferably 90/10 to 30/70, more preferably 80/20 to 40/60 is suitable.

Specifically, styrene-ethylene-butylene-styrene copolymer (SEBS) which is a hydrogenated product of a styrene-butadiene block copolymer, or styrene-ethylene-propylene-styrene copolymer (SEPS) which is a hydrogenated product of a styrene-isoprene block copolymer can be mentioned as the component ($b^2$).

Of these, SEPS is preferred from the viewpoint of the compatibility with the component (A).

A hydrogenated product of a block copolymer of styrene or a derivative thereof and a conjugated diene, having a weight-average molecular weight of 50,000 to 220,000, preferably 50,000 to 200,000, more preferably 50,000 to 150,000 is suitably used as the component ($b^2$).

The "weight-average molecular weight" herein defined is one determined by gel permeation chromatography under the following conditions, calculated in terms of polystyrene:

apparatus: 150C ALC/GPC (manufactured by MILLIPORE Corp.),
column: 3 pieces of AD80M/S (manufactured by Showa Denko K. K.),
solvent: o-dichlorobenzene,
temperature: 140° C.,
flow velocity: 1 ml/min,
amount injected: 200 microliters, and
concentration: 2 mg/ml (0.2% by weight of an antioxidant, 2,6-di-t-butyl-p-phenol was added. The concentration was detected at a wavelength of 3.42 micrometers by an infrared spectrophotometer "MIRAN 1A" manufactured by FOXBORO Corp.).

When a component ($b^2$) whose weight-average molecular weight is less than the above-described range is used, the component (B) is dispersed by being oriented to the direction of flow. Therefore, it is impossible to obtain a resin composition in which the uniform network dispersion of the acrylamide copolymer, the component (C), an aim of the present invention, is attained. In addition, such a resin composition tends to have impaired rubber elasticity and decreased mechanical strength. On the other hand, a component ($b^2$) whose weight-average molecular weight is in excess of the above-described range tends to impair the molding properties of the resulting resin composition, thus providing a molded product having bad appearance.

The block copolymer of styrene or a derivative thereof and a conjugated diene is one whose styrene or its derivative content is from 15 to 50% by weight, preferably from 18 to 45% by weight, more preferably from 20 to 40% by weight.

A block copolymer whose styrene or its derivative content is lower than the above range is poor in both rubber elasticity and strength, so that such a block copolymer is of no practical use. On the other hand, a block copolymer whose styrene or its derivative content is higher than the above range has poor compatibility with the acrylamide copolymer, the component (C) and with the crystalline propylene resin, the component (A). Therefore, the resulting resin composition cannot have sufficiently high impact resistance required for those materials which are used for producing containers to be used for storage or transportation.

Further, it is preferable that the rate of hydrogenation of the component ($b^2$) be 95% by weight or more, particularly from 97 to 100% by weight from the viewpoint of weather resistance.

When the above-described thermoplastic elastomer is not used, the uniform network dispersion of the acrylamide copolymer cannot be attained in the resulting resin composition, and delamination tends to be readily occurred, as will be described later.

(c) Acrylamide copolymer (Component (C))

The following copolymer (1) or (2) is used as the acrylamide copolymer for the thermoplastic resin composition of the present invention, having excellent antistatic properties.

These acrylamide copolymers can be prepared in accordance with the known methods described in Japanese Laid-Open Patent Publications Nos. 198308/1992 and 126446/1995.

(1) An acrylamide copolymer having a weight-average molecular weight of 1,000 to 50,000, preferably 3,000 to 35,000, comprising the following structural units which are linearly and irregularly arranged:

65 to 99 mol %, preferably 85 to 97 mol % of ethylene structural unit represented by the following general formula (I):

$$+CH_2-CH_2+, \qquad (I)$$

0 to 15 mol %, preferably 3 to 7 mol % of acrylate structural unit represented by the following general formula (II):

$$\begin{array}{c}+CH_2-CH+\\|\\COOR^1\end{array} \qquad (II)$$

wherein R1 represents an alkyl group having 1 to 4 carbon atoms, preferably 1 or 2 carbon atoms, and 1 to 35 mol %, preferably 3 to 15 mol % of acrylamide structural unit represented by the following general formula (III):

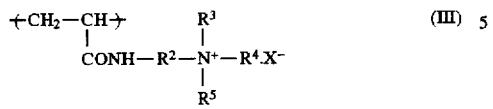

wherein $R^2$ represents an alkylene group having 2 to 8 carbon atoms, preferably 2 or 3 carbon atoms, $R^3$ and $R^4$ each represent an alkyl group having 1 to 4 carbon atoms, preferably 1 or 2 carbon atoms, $R^5$ represents an alkyl group having 1 to 12 carbon atoms, preferably 1 or 2 carbon atoms, an arylalkyl group having 1 to 12 carbon atoms, or an alicyclic alkyl group having 1 to 12 carbon atoms, and $X^-$ represents a halogen ion, preferably $Cl^-$, or $CH_3OSO_3^-$ or $C_2H_5OSO_3^-$; or (2) an acrylamide copolymer having a weight-average molecular weight of 1,000 to 50,000, preferably 3,000 to 35,000, comprising the following structural units which are linearly and irregularly arranged:

65 to 99 mol %, preferably 85 to 97 mol % of ethylene structural unit represented by the following general formula (IV):

0 to 15 mol %, preferably 3 to 7 mol % of acrylate structural unit represented by the following general formula (V):

wherein $R^1$ represents an alkyl group having 1 to 4 carbon atoms, preferably 1 or 2 carbon atoms, and 1 to 35 mol % of acrylamide structural unit represented by the following general formula (VI):

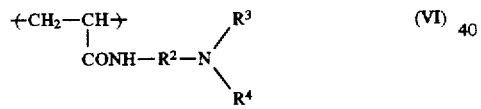

wherein $R^2$ represents an alkylene group having 2 to 8 carbon atoms, preferably 2 or 3 carbon atoms, and $R^3$ and $R^4$ each represent an alkyl group having 1 to 4 carbon atoms, preferably 1 or 2 carbon atoms.

In the case where the proportion of the ethylene structural unit is less than 65 mol %, the acrylamide copolymer has a lowered softening point, so that tackiness or stickiness is imparted to the resulting thermoplastic resin composition. On the other hand, when the proportion of the ethylene structural unit is in excess of 99 mol %, the acrylamide copolymer has impaired antistatic properties. The proportion of the acrylate structural unit is preferably 15 mol % or less, more preferably 3 to 7 mol % from the viewpoint of the balance between softening point and impact resistance. When the proportion of the acrylamide structural unit is less than 1 mol %, the acrylamide copolymer is to have impaired antistatic properties. On the other hand, the proportion of the acrylamide structural unit is in excess of 35 mol %, the resulting thermoplastic resin becomes hygroscopic.

Further, an acrylamide copolymer having a weight-average molecular weight of less than 1000 is waxy, so that it has poor handling properties. In addition, such an acrylamide copolymer bleeds out from the resulting resin composition, so that stickiness is unfavorably imparted to the resin composition. On the other hand, an acrylamide copolymer whose weight-average molecular weight is more than 50,000 has poor compatibility with both the propylene resin and the thermoplastic elastomer, so that such a copolymer is not favorable.

It is noted that the weight-average molecular weights of the acrylamide copolymers are those which are determined by gel permeation chromatography (GPC), calculated in terms of polystyrene. Specifically, the weight-average molecular weights can be determined by the ultra-high temperature GPC method (the method described by Kinukawa in "Japanese Journal of Polymer Science and Technology" Vol. 44, No. 2, pp. 139–141).

Of these acrylamide copolymers, the copolymer (1) is commercially-available as "REOLEX AS 170" from Dai-Ichi Kogyo Seiyaku Co., Ltd.

(d) Amount of thermoplastic elastomer incorporated

The thermoplastic elastomer is incorporated in an amount of 3 to 30 parts by weight, preferably 5 to 20 parts by weight, more preferably 8 to 15 parts by weight for 100 parts by weight of the above-described propylene resin, the component (A).

When the amount of the thermoplastic elastomer incorporated is less than the above range, a uniform network dispersion of the acrylamide copolymer, the component (C), cannot be sufficiently obtained. Therefore, the resulting resin composition cannot have sufficiently high impact resistance required for those materials which are used for producing containers to be used for storage or transportation. On the other hand, when the amount of the thermoplastic elastomer incorporated is more than the above range, while the effect of providing a uniform network dispersion of the acrylamide copolymer in the resulting resin composition is not appreciably improved, the resulting resin composition has a remarkably lowered rigidity.

(e) Amount of acrylamide copolymer incorporated

The acrylamide copolymer is incorporated in an amount of 5 to 40 parts by weight, preferably 10 to 35 parts by weight, more preferably 15 to 30 parts by weight for 100 parts by weight of the propylene resin, the component (A).

When the amount of the acrylamide copolymer incorporated is less than the above range, the resulting resin composition cannot have antistatic properties. On the other hand, when the amount of the acrylamide copolymer incorporated is in excess of the above range, the resulting resin composition is to have drastically impaired rigidity. Therefore, such a resin composition cannot have sufficiently high rigidity required for those materials which are used for producing containers to be used for storage or transportation.

(3) Other Components (Component (D))

Other components such as an antioxidant, a light stabilizer, a lubricant, a flame retarder, a dispersant, a coloring agent such as a dye or pigment, an inorganic filler and an organic filler may be optionally incorporated, when necessary, into the thermoplastic resin composition of the present invention, having excellent antistatic properties.

In particular, 0.01 to 1 part by weight of a coloring agent can be incorporated into 100 parts by weight of the thermoplastic resin composition of the present invention, comprising the above-described components (A), (B) and (C). By doing so, colored molded products which can meet various applications can be obtained.

(4) Production of Thermoplastic Resin Composition

The thermoplastic resin composition of the present invention, having excellent antistatic properties can be obtained by mixing the above-described components (A), (B) and (C), and, if necessary, the component (D), in the above-mentioned proportions, and by kneading and granulating the mixture using a conventional kneader such as a single-screw extruder, a twin-screw extruder, a Banbury mixer, a roll mixer, a Brabender Plastograph or a kneading blender.

In this case, it is preferable to select a kneading-granulation method by which all of the components can be fully dispersed. In general, the kneading-granulation is conducted by the use of a twin-screw extruder.

In this kneading-granulation step, the components (A), (B) and (C), and, if necessary, the component (D) may be kneaded at the same time. However, in order to obtain improved properties, it is preferable to conduct stepwise the kneading-granulation; thus, after the component (A) and a part of or all of the component (B) are firstly mixed and kneaded, the components (C) and (D) are added to the mixture, and the resulting mixture is then kneaded and granulated. In the case where all of the components are kneaded at the same time, heat is generated due to the shear caused between the solid phases before the matrix resin (the components (A)+(B)) is plasticized in an extrusion kneader. For this reason, the cylinder temperature can be raised to a temperature considerably higher than the predetermined one. Since the component (C) does not have sufficiently high resistance to heat, there is a fear that it is decomposed due to that high temperature, so that the resulting resin composition has decreased conductivity.

In contrast, when kneading is conducted stepwise, that is, the component (C) is added to the matrix components after the matrix components are plasticized, the component (C) can be kneaded without suffering from the extra heat generated due to the shear between the solid phases of the matrix resin. There is therefore no possibility that the component (C) is thermally decomposed, and the conductivity of the resulting resin composition can thus be prevented from being impaired.

The kneading temperature (the cylinder temperature) during the melt extrusion kneading is usually from 150° to 250° C., preferably from 180° to 230° C., and particularly from 200° to 210° C. When the kneading temperature is lower than 150° C., the difference between the viscosity of the component (A) and that of the component (B) is large, so that a homogenous composition cannot be obtained. On the other hand, when the kneading temperature is higher than 250° C., the component (C) is thermally decomposed.

The kneading time is from 0.5 to 10 minutes, preferably from 1 to 5 minutes, more preferably from 2 to 4 minutes. When the kneading time is shorter than 0.5 minutes, the component (A) cannot be fully plasticized, so that a homogenous composition cannot be obtained. On the other hand, when the kneading time is longer than 10 minutes, the thermal stability of the component (C) may be impaired.

When kneading is conducted stepwise as described above, it is preferable to adopt the following manner: after the components (A) and (B) are kneaded for 1 to 2 minutes, preferably for 1 minute (preceding stage of kneading), the component (C) is added to the mixture, and the resulting mixture is kneaded for 1 to 2 minutes, preferably for 1 minute (latter stage of kneading). In this case, it is preferable to maintain the kneading temperature (cylinder temperature) constant throughout the preceding stage and latter stage of kneading.

[II] Molding

The thus-obtained thermoplastic resin composition having excellent antistatic properties can be subjected to various molding methods such as injection molding, extrusion molding, blow molding, vacuum molding and expansion molding to obtain containers to be used for the storage or transportation of electronic parts such as semiconductors and substrates of electronic circuits, and a variety of electronic equipments and precision machines, packaging materials for these things; containers or packaging materials to be used to protect medical supplies, cosmetics, foods and the like from dusts, or to be used for the transportation of these things; and containers or the like to be used for the storage of hazardous materials and the like.

[III] Microstructure

By the electron-microscopic observation of the microstructure of the thermoplastic resin composition of the present invention, having excellent antistatic properties, it can be confirmed that since the above-described specific thermoplastic elastomer, the component (B), is present in the resin composition, the uniform network dispersion of the acrylamide copolymer, the component (C), is attained in the resin composition with the aid of the thermoplastic elastomer, the component (B).

On the other hand, when the thermoplastic elastomer is not present in the thermoplastic resin composition, the uniform network dispersion of the acrylamide copolymer cannot be attained in the resin composition. In this case, the acrylamide copolymer is unevenly distributed in the vicinity of the surface of the thermoplastic resin composition due to the shear caused upon molding, thereby forming a layer. The heterogeneous layer of the acrylamide copolymer thus formed in the vicinity of the surface of the thermoplastic resin composition is easily delaminated from the thermoplastic resin composition.

The present invention will now be explained more specifically by referring to the following Examples and Comparative Examples. It should be noted that these examples are not limiting the present invention in any way.

[I] Starting Materials (1) Component (A): Propylene Resin

A-1: Homopolypropylene resin, "Mitsubishi Polypro MH4" manufactured by Mitsubishi Chemical Corp. (MFR= 5.0 g/10 min, crystallinity=73%)

A-2: Ethylene-propylene copolymer resin, "Mitsubishi Polypro BC3" manufactured by Mitsubishi Chemical Corp. (MFR=10.0 g/10 min, ethylene content=9% by weight, crystallinity=65%)

A-3: Homopolypropylene resin, "Mitsubishi Polypro MH6" manufactured by Mitsubishi Chemical Corp. (MFR= 0.8 g/10 min, crystallinity=74%)

A-4: Homopolypropylene resin, a product of Mitsubishi Chemical Corp., made on an experimental base (a product obtained by treating the above-described "Mitsubishi Polypro MH4" with peroxide, MFR=120 g/10 min, crystallinity=73%)

(2) Component B: Thermoplastic Elastomer ($b^1$) Olefin Copolymer Elastomer $b^1$-1: Ethylene-propylene copolymer elastomer, "EP07P" manufactured by Japan Synthetic Rubber Co., Ltd. (Mooney viscosity=70, weight-average molecular weight=230,000, ethylene content=70% by weight)

$b^1$-2: Ethylene-propylene copolymer elastomer, "EP02P" manufactured by Japan Synthetic Rubber Co., Ltd. (Mooney viscosity=24, weight-average molecular weight=130,000, ethylene content=70% by weight)

$b^1$-3: Ethylene-propylene copolymer elastomer, "TAFMER P0080K" manufactured by Mitsui Petrochemical Industries, Ltd. (Mooney viscosity=less than 5, weight-average molecular weight=70,000, ethylene content=71% by weight)

$b^1$-4: Ethylene-propylene copolymer elastomer, "EP57P" manufactured by Japan Synthetic Rubber Co., Ltd. (Mooney viscosity=88, weight-average molecular weight=280,000, ethylene content=68% by weight)

(b$^2$) Styrene Elastomer b$^2$-1: SEBS, "Kraton G1657" manufactured by Shell Kagaku K. K. (styrene content=14% by weight, weight-average molecular weight=90,000)

b$^2$-2: SEBS, "Kraton G1652" manufactured by Shell Kagaku K. K. (styrene content=29% by weight, weight-average molecular weight=89,000)

b$^2$-3: SEBS, "Kraton G1651" manufactured by Shell Kagaku K. K. (styrene content=30% by weight, weight-average molecular weight=240,000)

b$^2$-4: SEPS, "Septon 2104" manufactured by Kuraray Co., Ltd. (styrene content=65% by weight, weight-average molecular weight=96,000)

b$^2$-5: SEPS, "Septon 2002" manufactured by Kuraray Co., Ltd. (styrene content=30% by weight, weight-average molecular weight=60,000)

(3) Component (C): Acrylamide Copolymer

C-1: Acrylamide copolymer, "REOLEX AS170" manufactured by Dai-Ichi Kogyo Seiyaku Co., Ltd.

C-2: Acrylamide copolymer obtained in the following synthetic example:

(Synthetic Example) In a four-necked 10-liter flask equipped with a thermometer, a stirrer, a dropping funnel and a Dean-Stark trap, 4000 ml of xylene, 1500 g of an ethylene-ethyl acrylate-acrylic acid copolymer (the mol % ratio of ethylene/ethyl acrylate/acrylic acid being 90/5/5), and 10.0 g of p-toluene-sulfonic acid were charged. To this was added 264 g of N,N-dimethylaminopropylamine, and the mixture was heated to 140° C. by using an oil bath. Water produced was continuously removed by azeotropic distillation with xylene, and reaction was carried out at 140° C. for a further 17 hours. The amidation reaction was continued until water produced was not azeotropically distilled any more.

6000 g of the product thus obtained was cooled to 80° C. To this, 415 g of diethyl sulfate was gradually added dropwise from the dropping funnel over one hour. The reaction temperature was maintained at 90° C. by cooling the heat generated. After the dropping was completed, aging reaction was carried out at 100° C. for 4 hours. The product obtained was poured into a large amount of methanol. The precipitates produced were collected, and dried to obtain an acrylamide copolymer.

The yield of the acrylamide copolymer was 97.3% when calculated on the basis of the starting material, the ethylene-ethyl acrylate-acrylic acid copolymer. The weight-average molecular weight of the acrylamide copolymer was 5,500.

[II] Evaluation Methods (1) Molding Properties

In order to evaluate the molding properties, the MFR (g/10 min) was measured in accordance with ASTM D1238 (at 230° C., under a load of 2.16 kg).

(2) Impact Resistance

In order to evaluate the impact resistance, the Izod impact strength (kg·cm/cm$^2$) was measured in accordance with ASTM D256.

(3) Rigidity

In order to evaluate the rigidity, the three-point bending modulus (kg/cm$^2$) was measured in accordance with ASTM D790.

(4) Delamination

The sheet obtained by molding was observed as to whether delamination had been occurred near the gate, and evaluated in accordance with the following standard:

O: delamination had not been occurred at all;

Δ: delamination had been partially occurred; and

X: delamination had been occurred.

(5) Electrical Conductivity (Initial)

In order to evaluate the electrical conductivity, the surface resistivity (ohm/□) was measured by using a resistance meter "High Resta" manufactured by Mitsubishi Chemical Corp.

(6) Antistatic Properties (after 10-time washing)

The permanency of the antistatic properties (electrical conductivity) was evaluated by measuring the electrical conductivity of the molded product after the following procedure was repeated 10 times: the surface of the molded product was thoroughly washed with ion exchange water, and wiped with gauze to remove the water, and the molded product was then dried at 60° C. for 5 hours in a warm-air-circulating drier.

[III] Experiments (EXAMPLES 1 to 5 and 9 and Comparative Examples 1 to 13)

The above-described starting materials were mixed in accordance with the formulation shown in Table 1, and the mixture was melt-kneaded by a twin-screw extruder ("KTX40" manufactured by Kobe Steel, Ltd.; cylinder temperature=200° C., number of revolutions of the screws= 220 rpm) for 2 minutes. Thus, pelleted compositions of Examples 1 to 5 and 9 and Comparative Examples 1 to 13 were obtained.

From each of the pelleted compositions, specimens to be used for evaluating the impact resistance (Izod impact strength) and the rigidity (bending modulus), and sheets having a thickness of 1 mm, a width of 150 mm and a length of 300 mm to be used for evaluating the antistatic properties and the delamination were prepared by using an injection molding machine ("IS170" manufactured by Toshiba Corp.) (cylinder temperature=220° C., mold temperature=40° C., cooling time=20 seconds, injection pressure=500 kg/cm$^2$, dwell pressure=450 kg/cm$^2$, injection speed=3 second/shot, dwell time=12 seconds).

In accordance with the above-described evaluation methods, evaluation was conducted by using the specimens and the sheets obtained. The results are as shown in Table 1.

Further, the cross sections of the sheets prepared in Example 1 and Comparative Example 6 were respectively observed by an electron microscope. As shown in Photographs 1-1 to 1-3, the uniform network dispersion of the acrylamide copolymer, the component (C), is attained with the aid of the thermoplastic elastomer, the component (B), in the sheet obtained in Example 1. In contrast, as shown in Photographs 2-1 to 2-3, the acrylamide copolymer particles are not uniformly dispersed, and delamination is found in the sheet obtained in Comparative Example 6.

(EXAMPLES 6 to 8 and 10)

The components (A) and (B) out of the above-described starting materials were mixed in accordance with the mixing ratio shown in Table 1, and the mixture was melt-kneaded by a twin-screw extruder ("KTX40" manufactured by Kobe Steel, Ltd., cylinder temperature=200° C., number of revolutions of the screws=220 rpm) for one minute. Thereafter, the component (C) in the amount shown in Table 1 was added to the mixture, and the resulting mixture was melt-kneaded for a further one minute. Thus, pelleted compositions of Examples 6, 7, 8 and 10 were obtained. Subsequently, specimens and sheets to be used for the evaluation were made from each of the compositions by injection molding conducted under the same conditions as in Example 1, and subjected to the evaluation. The results are as shown in Table 1.

TABLE 1

| Components | | | | | | Example | | | | | |
|---|---|---|---|---|---|---|---|---|---|---|---|
| (Amount: parts by weight) | 1 | 2 | 3 | 4 | 5 | 6 | 7 | 8 | 9 | 10 |
| Component (A): Propylene Resin | | | | | | | | | | |
| A-1 (MFR: 5.0 g/10 min) | 100 | — | — | — | — | — | — | — | — | — |
| A-2 (MFR: 10.0 g/10 min) | — | 100 | 100 | — | 100 | 100 | — | 100 | 100 | 100 |
| A-3 (MFR: 0.8 g/10 min) | — | — | — | — | — | — | 100 | — | — | — |
| A-4 (MFR: 120.0 g/10 min) | — | — | — | 100 | — | — | — | — | — | — |
| Component (B): Thermoplastic Elastomer | | | | | | | | | | |
| (b¹) Olefin Copolymer Elastomer | | | | | | | | | | |
| b¹-1 (Mooney Viscosity: 70) | 20 | — | 10 | — | 5 | 20 | — | — | 20 | 20 |
| b¹-2 (Mooney Viscosity: 24) | — | 20 | — | 30 | — | — | 30 | — | — | — |
| b¹-3 (Mooney Viscosity: 5>) | — | — | — | — | — | — | — | — | — | — |
| b¹-4 (Mooney Viscosity: 88) | — | — | — | — | — | — | — | — | — | — |
| (b²) Styrene Elastomer | | | | | | | | | | |
| b²-1 (Styrene Content 14 wt. %) | — | — | 20 | — | — | — | — | — | — | — |
| b²-2 (Styrene Content 29 wt. %) | — | — | — | — | — | — | — | — | — | — |
| b²-3 (Styrene Content 33 wt. %) | — | — | — | — | — | — | — | — | — | — |
| b²-4 (Styrene Content 65 wt. %) | — | — | — | — | — | — | — | — | — | — |
| b²-5 (Styrene Content 30 wt. %) | — | — | — | — | — | — | — | 20 | — | — |
| Component (C): Acrylamide Copolymer | | | | | | | | | | |
| c-1 | 20 | 20 | 20 | 10 | 30 | 20 | 10 | 20 | — | — |
| c-2 | — | — | — | — | — | — | — | — | 20 | 20 |
| Kneading Method | Simul-taneous | Simul-taneous | Simul-taneous | Simul-taneous | Simul-taneous | Stepwise | Stepwise | Stepwise | Simul-taneous | Stepwise |

| Components | | | | | Comparative Example | | | | | | | | |
|---|---|---|---|---|---|---|---|---|---|---|---|---|---|
| (Amount: parts by weight) | 1 | 2 | 3 | 4 | 5 | 6 | 7 | 8 | 9 | 10 | 11 | 12 | 13 |
| Component (A): Propylene Resin | | | | | | | | | | | | | |
| A-1 (MFR: 5.0 g/10 min) | 100 | 100 | — | — | — | — | — | — | — | — | — | — | — |
| A-2 (MFR: 10.0 g/10 min) | — | — | 100 | — | 100 | 100 | 100 | 100 | 100 | 100 | 100 | 100 | 100 |
| A-3 (MFR: 0.8 g/10 min) | — | — | — | — | — | — | — | — | — | — | — | — | — |
| A4 (MFR: 120.0 g/10 min) | — | — | — | 100 | — | — | — | — | — | — | — | — | — |
| Component (B): Thermoplastiac Elastomer | | | | | | | | | | | | | |
| (b¹) Olefin Copolymer Elastomer | | | | | | | | | | | | | |
| b¹-1 (Mooney Viscosity: 70) | 40 | — | 10 | 20 | 5 | — | — | — | — | 2 | — | — | — |
| b¹-2 (Mooneyu Viscosity: 24) | — | 5 | — | — | — | — | — | — | — | — | 20 | — | — |
| b¹-3 (Mooney Viscosity: 5>) | — | — | — | — | — | — | — | — | — | — | — | 20 | — |
| b¹-4 (Mooney Viscosity: 88) | — | — | — | — | — | — | — | — | — | — | — | — | 20 |
| (b²) Styrene Elastomer | | | | | | | | | | | | | |
| b²-1 (Styrene Content 14 wt. %) | — | — | — | — | — | — | — | 20 | — | — | — | — | — |

TABLE 1-continued

| | | | | | | Example | | | | | | |
|---|---|---|---|---|---|---|---|---|---|---|---|---|
| | 1 | 2 | 3 | 4 | 5 | 6 | 7 | 8 | 9 | 10 | | |
| b²-2 (Styrene Content 29 wt. %) | — | 15 | — | — | — | — | — | — | — | — | — | |
| b²-3 (Styrene Content 33 wt. %) | — | — | — | 15 | 30 | — | — | — | — | — | 45 | |
| b²-4 (Styrene Content 65 wt. %) | — | — | — | — | — | — | — | — | — | — | — | |
| b²-5 (Styrene Content 30 wt. %) | — | — | — | — | — | — | — | — | — | — | — | |
| Component (C): Acrylamide Copolymer | | | | | | | | | | | | |
| c-1 | 30 | — | — | — | — | 20 | — | 20 | — | 20 | — | |
| c-2 | — | — | 4 | — | — | — | 20 | — | 20 | — | — | |
| Kneading Method | Simul-taneous | Simul-taneous | Simul-taneous | Simul-taneous | Simul-taneous | Simul-taneous | Simul-taneous | Simul-taneous | Simul-taneous | Simul-taneous | Simul-taneous | |

| Evaluation | 1 | 2 | 3 | 4 | 5 | 6 | 7 | 8 | 9 | 10 |
|---|---|---|---|---|---|---|---|---|---|---|
| MFR (g/10 min) | 6.2 | 7.3 | 10.0 | 9.2 | 5.8 | 6.6 | 9.8 | 7.3 | 7.0 | 7.2 |
| Izod Impact Strength (with notch) (kg · cm/cm²) | 6.8 | 6.4 | 8.2 | 7.7 | 5.6 | 7.0 | 8.1 | 8.2 | 7.4 | 7.3 |
| Rigidity (3-point bending modulus) (kg/cm²) | 12,000 | 11,000 | 12,000 | 10,500 | 12,500 | 11,500 | 10,000 | 12,100 | 11,500 | 11,000 |
| Delamination | ○ | ○ | ○ | ○ | ○ | ○ | ○ | ○ | ○ | ○ |
| Surface Resistivity (initial) (Ω/□) | $9 \times 10^{10}$ | $1 \times 10^{11}$ | $8 \times 10^{10}$ | $3 \times 10^{12}$ | $4 \times 10^{10}$ | $2 \times 10^{10}$ | $1 \times 10^{12}$ | $9 \times 10^{10}$ | $4 \times 10^{10}$ | $3 \times 10^{10}$ |
| Surface Resistivity (after 10-time washing) (Ω/□) | $8 \times 10^{10}$ | $1 \times 10^{11}$ | $9 \times 10^{10}$ | $2 \times 10^{12}$ | $2 \times 10^{10}$ | $1 \times 10^{10}$ | $9 \times 10^{11}$ | $9 \times 10^{10}$ | $5 \times 10^{10}$ | $3 \times 10^{10}$ |

| Evaluation | Comparative Example | | | | | | |
|---|---|---|---|---|---|---|---|
| | 1 | 2 | 3 | 4 | 5 | 6 | 7 |
| | | | | | | 11 | 12 | 13 |

| Evaluation | 1 | 2 | 3 | 4 | 5 | 6 | 7 | 8 | 9 | 10 | 11 | 12 | 13 |
|---|---|---|---|---|---|---|---|---|---|---|---|---|---|
| MFR (g/10 min) | 12.2 | 6.1 | 10.8 | 118.0 | 1.2 | 5.4 | 6.7 | 7.0 | 5.3 | 5.4 | 6.0 | 8.1 | 9.7 |
| Izod Impact Strength (with notch) (kg · cm/cm²) | | 2.5 | 6.9 | 1.5 | 4.8 | 2.1 | 3.8 | 4.3 | 3.3 | 2.2 | 20 | 5.8 | 3.1 |
| Rigidity (3-point bending modulus) (kg/cm²) | 5,800 | 14,000 | 16,000 | 13,000 | 14,500 | 15,000 | 13,000 | 13,000 | 12,500 | 15,500 | 8,500 | 10,500 | 12,800 |
| Delamination | ○ | △ | ○ | ○ | △ | × | × | △ | × | △ | △ | × | × |
| Surface Resistivity (initial) (Ω/□) | $4 \times 10^{10}$ | $6 \times 10^{12}$ | $2 \times 10^{13}$ | $7 \times 10^{12}$ | $4 \times 10^{10}$ | $7 \times 10^{11}$ | $6 \times 10^{11}$ | $8 \times 10^{10}$ | $9 \times 10^{10}$ | $1 \times 10^{11}$ | $4 \times 10^{9}$ | $6 \times 10^{10}$ | $3 \times 10^{11}$ |
| Surface Resistivity (after 10-time washing) (Ω/□) | $3 \times 10^{10}$ | $5 \times 10^{12}$ | $9 \times 10^{13}$ | $5 \times 10^{12}$ | $3 \times 10^{10}$ | $6 \times 10^{11}$ | $4 \times 10^{11}$ | $8 \times 10^{10}$ | $1 \times 10^{11}$ | $1 \times 10^{11}$ | $5 \times 10^{9}$ | $6 \times 10^{10}$ | $2 \times 10^{11}$ |

What is claimed is:

1. A thermoplastic resin composition having excellent antistatic properties comprising 100 parts by weight of the following component (A), 3 to 30 parts by weight of the following component (B) and 5 to 40 parts by weight of the following component (C):

component (A): a crystalline propylene resin having a melt flow rate (MFR) of 1 to 80 g/10 min;

component (B): a thermoplastic elastomer selected from (b$^1$) olefin copolymer elastomers having a Mooney viscosity (ML$_{1+4}$ (100° C.)) of 10 to 85, and (b$^2$) hydrogenated products of a block copolymer of styrene or a derivative thereof and a conjugated diene, containing 15 to 50% by weight of styrene or a derivative thereof, having a weight-average molecular weight of 50,000 to 220,000; and component (C): an acrylamide copolymer, wherein the thermoplastic resin composition is prepared by a process comprising first mixing and melt-kneading the components (A) and (B), adding the component (C) to the resulting mixture and then further melt-kneading the resulting mixture.

2. The thermoplastic resin composition according to claim 1, obtained in the following manner: after the components (A) and (B) are melt-kneaded at a temperature of 150° to 250° C. for 1 to 2 minutes, the component (C) is added to the mixture, and the resulting mixture is further subjected to melt-kneading conducted at a temperature of 150° to 250° C. for 1 to 2 minutes.

3. The thermoplastic resin composition according to claim 1, wherein the crystalline propylene resin, the component (A), has an MFR of 3 to 40 g/10 min.

4. The thermoplastic resin composition according to claim 1, wherein the thermoplastic elastomer, the component (B), is an ethylene-propylene copolymer elastomer, having ethylene content of 40 to 90% by weight.

5. The thermoplastic resin composition according to claim 1, wherein the thermoplastic elastomer, the component (B), is a hydrogenated product of a styrene-butadiene block copolymer or a styrene-isoprene block copolymer having a styrene content of 20 to 40% by weight.

6. The thermoplastic resin composition according to claim 1, wherein the acrylamide copolymer, the component (C), is one having a weight-average molecular weight of 1,000 to 50,000, comprising the following structural units which are linearly and irregularly arranged:

65 to 99 mol % of ethylene structural unit represented by the following general formula (I):

(I)

0 to 15 mol % of acrylate structural unit represented by the following general formula (II):

(II)

wherein R$^1$ represents an alkyl group having 1 to 4 carbon atoms, and 1 to 35 mol % of acrylamide structural unit represented by the following general formula (III):

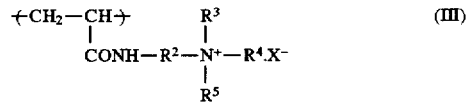
(III)

wherein R$^2$ represents an alkylene group having 2 to 8 carbon atoms, R$^3$ and R$^4$ each represent an alkyl group having 1 to 4 carbon atoms, R$^5$ represents an alkyl group having 1 to 12 carbon atoms, an arylalkyl group having 1 to 12 carbon atoms, or an alicyclic alkyl group having 1 to 12 carbon atoms, and X$^-$ represents a halogen ion, CH$_2$OSO$_3^-$ or C$_2$H$_5$OSO$_3^-$.

7. The thermoplastic resin composition according to claim 1, wherein the acrylamide copolymer, the component (C), is one having a weight-average molecular weight of 1,000 to 50,000, comprising the following structural units which are linearly and irregularly arranged:

65 to 99 mol % of ethylene structural unit represented by the following general formula (IV):

(IV)

0 to 15 mol % of acrylate structural unit represented by the following general formula (V):

(V)

wherein R$^1$ represents an alkyl group having 1 to 4 carbon atoms, and 1 to 35 mol % of acrylamide structural unit represented by the following general formula (VI):

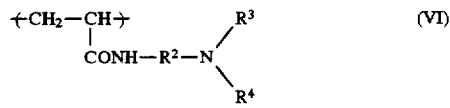
(VI)

wherein R$^2$ represents an alkylene group having 2 to 8 carbon atoms, and R$^3$ and R$^4$ each represent an alkyl group having 1 to 4 carbon atoms.

8. The thermoplastic resin composition according to claim 1, obtained by incorporating 5 to 20 parts by weight of the component (B) and 15 to 30 parts by weight of the component (C) into 100 parts by weight of the component (A).

* * * * *